United States Patent
Strakovsky

(10) Patent No.: US 6,400,777 B1
(45) Date of Patent: Jun. 4, 2002

(54) LINEAR MODULATOR

(75) Inventor: Leonid Strakovsky, Rumson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/067,867

(22) Filed: Apr. 28, 1998

(51) Int. Cl.$^7$ ............................................. H04L 27/04
(52) U.S. Cl. ....................... 375/301; 375/295; 375/300; 332/107; 332/149
(58) Field of Search ................................. 375/301, 233, 375/358, 297, 308, 295, 300; 332/107, 149; 327/554; 702/124

(56) References Cited

U.S. PATENT DOCUMENTS

| | | | |
|---|---|---|---|
| 3,829,797 A | | 8/1974 | Karkar et al. .................. 332/43 |
| 4,198,675 A | * | 4/1980 | Moore ......................... 702/124 |
| 4,393,395 A | | 7/1983 | Hacke et al. .................. 358/23 |
| 4,602,226 A | * | 7/1986 | Vatis ........................... 332/149 |
| 4,614,911 A | | 9/1986 | Kawano ....................... 329/101 |
| 4,724,405 A | | 2/1988 | Matthies et al. ............... 332/31 |
| 4,727,596 A | | 2/1988 | Jaffer .......................... 455/326 |
| 5,027,163 A | | 6/1991 | Dobrovolny ................. 455/326 |
| 5,095,290 A | | 3/1992 | Sevenhans et al. ......... 332/152 |
| 5,168,179 A | * | 12/1992 | Negahban-High .......... 327/554 |
| 5,329,189 A | | 7/1994 | Ushida et al. ............... 307/529 |
| 5,465,420 A | | 11/1995 | Dougherty et al. ......... 455/333 |
| 5,606,738 A | | 2/1997 | Onodera et al. ............. 455/333 |
| 5,798,674 A | * | 8/1998 | Fountain ...................... 332/149 |
| 5,909,153 A | * | 6/1999 | Delano et al. ............... 332/107 |

* cited by examiner

Primary Examiner—Stephen Chin
Assistant Examiner—Shuwang Liu

(57) ABSTRACT

Systems and methods for enhancing the linearity of a modulator by filtering a set of frequency components from the modulator output to develop a modulator feedback signal. In a preferred embodiment of the invention, a diplexer separates the output of a balanced modulator into a first frequency spectrum and a second frequency spectrum. The first frequency spectrum contains the modulated output signal, and the second frequency spectrum contains the modulator feedback signal which is combined with the modulating signal to enhance the linearity of the modulator.

18 Claims, 3 Drawing Sheets

LINEAR MODULATOR

BACKGROUND

1. Field of the Invention

The invention relates generally to RF communication circuits, and, more specifically, to modulators.

2. Description of Related Art

A modulator is a type of mixer that combines a radio-frequency (RF) carrier with a modulating signal to develop a modulated output signal. One notable performance parameter for a modulator is linearity, which is defined as the degree to which the amplitude of the modulated output signal is proportional to the amplitude of the modulating signal. In operational environments where frequency modulation is employed, including AMPS (advanced mobile telephone service), modulator linearity is generally not a critical parameter. However, a number of recently-developed wireless communication protocols utilize modulation schemes that are much more complex than basic frequency modulation, placing special demands on modulator performance. Existing modulators may provide insufficient linearity to meet these demands. More specifically, in the context of modulation schemes used to implement CDMA (code division multiple access), TDMA (time division multiple access), GSM (global system for mobile), and other types of wireless communication protocols, a modulator must be capable of transmitting data at a relatively high speed while, at the same time, providing reasonably error-free performance. Modulator nonlinearities will introduce errors into the modulated data, degrading the quality and reliability of an RF communications link.

Various techniques have been developed to enhance amplifier linearity, but these techniques are not readily adapted for use with modulators. For example, consider the use of negative feedback. In an amplifier, the input signal is typically at the same frequency as the desired output signal, and, moreover, the amplifier does not substantially change the modulation of the signal from input to output. A suitable amplifier feedback signal can be developed by attenuating the output signal and, if necessary, inverting its phase. By contrast, in a modulator, the desired output signal is generally in a different frequency band than the modulating signal. Moreover, the output is modulated, whereas the input receives an unmodulated carrier. It is often difficult or impossible to utilize the modulator output in a manner so as to provide a useful feedback signal.

The manner in which the linearity of a modulator may be enhanced depends, to some extent, on the type of modulator under consideration. There are two basic types of modulators: balanced and unbalanced. Unbalanced modulators advantageously exploit the nonlinearity of an active semiconductor device to produce a mixing effect. The output signal includes all input signals and a plurality of mixing products. Although generally considered to be an undesired property, the existence of all input signals at the mixer output is helpful in that it allows one to readily construct a suitable feedback signal. But due to the lack of unmodulated carrier suppression, unbalanced modulators are not well-suited for applications other than simple frequency conversion.

Balanced modulators are mixers which combine a first signal with a second signal in a manner such that the mixer output is substantially free of the first signal. Double-balanced modulators are a type of balanced modulator which provide an output which is substantially free of the first and second signals. Unfortunately, it is difficult to develop a suitable feedback signal to improve the linearity of a balanced modulator. Due to the fact that the modulator output is substantially free of one or more of the unmixed input signals, signal components which could be used to develop a feedback signal are lacking.

One type of balanced mixer well-known to those skilled in the art is a Gilbert Cell. US Pat. No. 5,095,290 (hereinafter, the '290 patent) discloses a modulator that uses negative feedback to improve the linearity of a Gilbert Cell. As with other types of balanced mixers, a Gilbert Cell lacks an output signal which is suitable for developing an appropriate feedback signal. The '290 patent overcomes this problem by using a first and a second Gilbert Cell. A first half of each Gilbert Cell is used to provide the modulated output signal, and a second half of each Gilbert Cell is used to reconstruct the modulating signal from a temporally sliced signal that is generated by each Gilbert Cell. The first Gilbert Cell provides a temporally sliced waveform that is complimentary to the temporally sliced waveform provided by the second Gilbert Cell. When these two temporally sliced waveforms are combined, they produce a usable modulator feedback signal.

The modulator described in the '290 patent presents a significant shortcoming. Although the temporally-sliced waveforms should theoretically fit together in a complementary manner, this requires a very high degree of matching between the active devices utilized in the Gilbert Cells. Accurate matching of device gain must be performed for each transistor-transistor pair within a Gilbert Cell. Additionally, the gain of each portion of the first Gilbert Cell must be closely matched to the gain of the corresponding portion of the second Gilbert Cell. If any transistor mismatches exist, the two temporally sliced waveforms will fit together poorly, if at all. Due to the fact that four pairs of transistors are used as differential amplifiers for the carrier signal, two pairs of transistors are used for the modulating signal, and two pairs of transistors are employed for the feedback signal, a significant amount of transistor matching must be performed.

Transistor matching procedures introduce added cost, complexity, and time delays into the semiconductor fabrication process. Moreover, the modulating signal is delayed in the modulator, resulting in a feedback signal that is out of phase with the modulated signal. It is not possible to reduce or eliminate all transistor-to-transistor mismatches. The remaining mismatches cause carrier imbalances whereby the carrier signal is not substantially cancelled out at the modulator output. In addition, the use of so many transistors and their corresponding interconnections provide numerous parasitic capacitance pathways that significantly limit high-frequency operation. What is needed is a modulator that provides improved linearity and that ameliorates the above-noted problems.

SUMMARY OF THE INVENTION

The linearity of a modulator is enhanced by filtering a set of frequency components from the modulator output to develop a modulator feedback signal. In a preferred embodiment of the invention, the output of a modulator is separated into a first frequency spectrum and a second frequency spectrum. The first frequency spectrum contains the modulated output signal, and the second frequency spectrum contains the modulator feedback signal which is combined with the modulating signal to enhance the linearity of the modulator.

DETAILED DESCRIPTION OF THE PREFERRED EMBODIMENTS

The invention is based upon a recognition that the linearity of a modulator may be improved by filtering a set of frequency components from the modulator output to develop a modulator feedback signal. In a preferred embodiment of the invention, a single balanced modulator is employed, and the aforementioned filtering of frequency components is implemented using a diplexer. The diplexer separates the output of the balanced modulator into a first frequency spectrum and a second frequency spectrum. The first frequency spectrum contains the modulated output signal, and the second frequency spectrum contains the modulator feedback signal which is combined with the modulating signal to enhance the linearity of the modulator.

Figure 1:
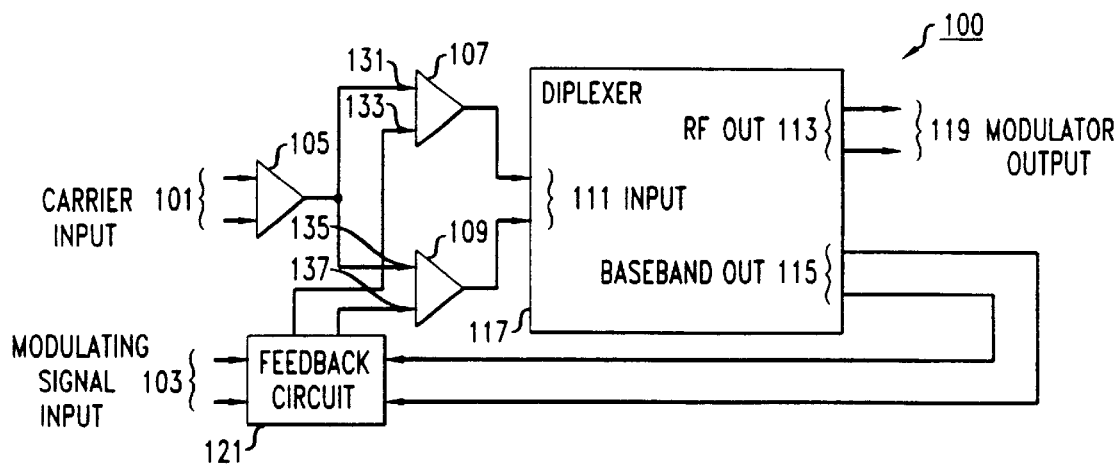
FIG. 1 is a hardware block diagram of a linear modulator constructed in accordance with the principles of the invention.

An illustrative example of a linear modulator constructed in accordance with the principles of the invention is shown in FIG. 1. Linear modulator 100 combines a radio-frequency (RF) carrier with a modulating signal to develop a modulated output signal. The RF carrier signal is introduced at carrier input 101, and the modulating signal is introduced at modulating signal input 103. In the example of FIG. 1, carrier input 101 is a differential input port of a first amplifier 105, and modulating signal input 103 is a differential input port of a feedback circuit. The output of first amplifier 105 is applied to a first differential input terminal 131 of a second amplifier 107, and also to a first differential input terminal 135 of a third amplifier 109. The output of feedback circuit 121 is applied to a second differential input terminal 133 of second amplifier 107, and also to a second differential input terminal 137 of third amplifier 109.

The output of second amplifier 107 is applied to a first terminal of a differential input 111 of a diplexer 117, and the output of third amplifier 109 is applied to a second terminal of the differential input 111. Diplexer 117 provides a differential baseband output 115 as well as a differential RF output 113. The differential baseband output 115 is applied to feedback circuit 121, and the differential RF output 113 provides the modulator output 119.

Taken together, the first, second, and third amplifiers 105, 107, 109 function as a single balanced mixer. A single balanced mixer provides a first input port, a second input port, and one output port. In the example of FIG. 1, the first input port is carrier input 101, the second input port is modulating signal input 103, and the output port is represented by the outputs of amplifiers 107 and 109 as fed differentially to diplexer 117. Differential input and output ports are shown for illustrative purposes, it being understood that a given port may, or may not, be differential. Balanced mixers provide two types of signals at the output port: 1) mixing products of the signals that are present at each of the two input ports, 2) an amplified version of signals that are fed into the second input port. Signals fed into the first input port are substantially absent, or significantly suppressed, from the output port.

First amplifier 105 functions as a buffer amplifier. In many cases, the use of such an amplifier is advantageous. However, other system applications may exist where a buffer is not needed and/or is undesired. Accordingly, first amplifier 105 may be eliminated, whereupon the carrier input 101 is then fed directly to the first differential input terminal 131 of second amplifier 107, and also to the first differential input terminal 135 of third amplifier 109.

Second and third amplifiers 107 and 109 should be substantially identical in terms of gain, input and output impedances, and dynamic range. The first differential input terminal 131 of second amplifier 107 should provide substantially the same impedance and gain as the first differential input terminal 135 of third amplifier 109, and the second differential input terminal 133 of second amplifier 107 should provide substantially the same impedance and gain as the second differential input terminal 137 of third amplifier 109. However, the impedance and gain of the first differential input terminal 131 of a respective amplifier 107 need not be substantially identical to the impedance and gain of the second differential input terminal 133 of that same amplifier 107. For the sake of convenience, first amplifier 105 could be identical to second and third amplifiers 107, 109, but this is not required.

Another factor to consider with respect to the design of second and third amplifiers 107, 109 is that, for each amplifier, the gain from the first differential input terminal to the amplifier output must be related to the signal at the second differential input terminal. In other words, the signal amplitude at the second differential input terminal must affect the instantaneous gain from the first differential input terminal to the amplifier output. The specific manner in which signals present at a second differential input affect the gain of signals present at a first differential input is a matter of design choice within the knowledge of those skilled in the art. The degree of gain interdependence, as well as the specific amounts of gain provided for each differential input terminal may vary, depending on the specific requirements of a given system implementation.

Operationally, the carrier signal, as buffered by first amplifier 105, is fed to the first differential input terminal 131 of second amplifier 107 and also to the first differential input terminal 135 of third amplifier 109. The amplified carrier signal at the output of second amplifier 107 has substantially the same amplitude and phase as the amplified carrier signal at the output of third amplifier 109. When the outputs of amplifiers 107 and 109 are combined differentially, the amplified carrier signal from second amplifier 107 cancels out the amplified carrier signal from third amplifier 109, leaving substantially no carrier signal at the input 111 of diplexer 117.

The differential output of feedback circuit 121, comprising a feedback signal, is fed differentially across the second differential input 133 of second amplifier 107 and the second differential input 137 of third amplifier 109. An amplified version of the feedback signal is present, in differential form, across the outputs of second and third amplifiers 107, 109. This differential feedback signal is applied differentially to the input 111 of diplexer 117. Due to the differential manner in which the feedback signal is applied to second and third amplifiers 107, 109, the amplified feedback signal does not cancel out at the input 111 of diplexer 117. Therefore, the input 111 to diplexer 117 primarily consists of the amplified version of the feedback signal, and an insignificant amount of residual carrier signal. Feedback circuit 121 could, but need not, be DC-coupled. Whether or not the feedback circuit is DC-coupled depends, to some extent, on the characteristics of the modulating signal. If the modulating signal contains very low frequencies and/or DC, then the feedback circuit should be DC-coupled. Note that, for most practical modulating signals, very low frequencies are present, and, therefore, a DC-coupled feedback circuit 121 may be used.

In the hardware embodiment of FIG. 1, diplexer 117 is used to provide a suitable feedback signal. When the amplified modulated signal developed by second and third amplifiers 107, 109 is applied differentially to the input 111 of diplexer 117, the diplexer 117 splits this amplified modulated signal in the frequency domain to provide a first signal in a first frequency bandwidth and a second signal in a second frequency bandwidth. The first frequency bandwidth includes a modulated output signal, and the second frequency bandwidth includes the feedback signal. The feedback signal improves modulation linearity, provides better carrier suppression for higher frequencies, and is adjustable so as to provide a specified amount of carrier suppression.

Operationally, diplexer 117 is a filter that provides one input port, which may or may not be differential, as well as two output ports, any of which may or may not be differential. The signal at the input port typically contains frequency components in the RF (radio frequency) range, as well as baseband frequency components. The diplexer 117 routes RF frequency components from the input port to the first output port, and routes baseband frequency components from the input port to the second output port.

Figure 2:
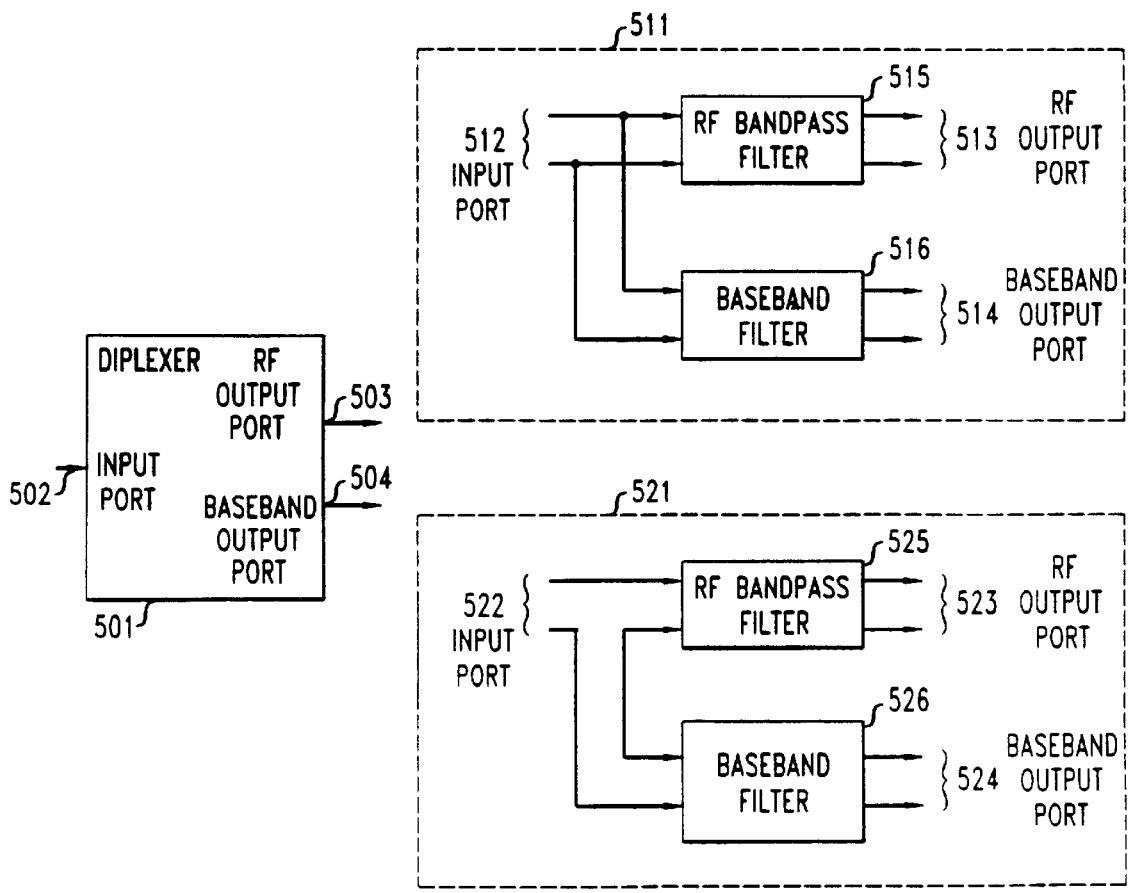
FIG. 2 is a hardware block diagram showing three illustrative prior art diplexers, any of which may be employed in the linear modulator of FIG. 1.

Any of various hardware configurations may be employed to implement diplexer 117, several examples of which are shown in FIG. 2. As discussed in the foregoing paragraph, a diplexer 501 provides an input port 502, an RF output port 503, and a baseband output port 504. A first illustrative diplexer 511 is constructed using an RF bandpass filter 515 and a baseband filter 516. The input terminals of RE bandpass filter 515 and baseband filter 516 are connected in parallel so as to provide an input port 512. The output of RF bandpass filter 515 provides RF output port 513, and the output of baseband filter 516 provides baseband output port 514. This circuit topology may be employed where RF bandpass filter 515 has a specified input impedance in the RF band but a relatively high input impedance in the baseband, and, at the same time, baseband filter 516 has a specified input impedance in the baseband but a relatively high impedance at RF frequencies. In this manner, interaction between the RF bandpass filter 515 and the baseband filter 516 is minimized.

Alternatively, a diplexer 521 may be constructed using an RF bandpass filter 525 which provides a specified input impedance at RF frequencies but a relatively low input impedance at baseband. Under these circumstances, a baseband filter 526 is employed which provides a specified input impedance at baseband but a relatively low impedance at RF frequencies. In the circuit configuration of diplexer 521, use of filters having the aforementioned characteristics will serve to minimize interactions between RF bandpass filter 525 and baseband filter 526. In practice, the RE bandpass filters 515, 525 of FIG. 2 may be implemented using high-pass filters, bandpass filters, or any combination thereof. Baseband filters 516, 526 may be implemented using low-pass filters, bandpass filters that pass baseband frequencies almost down to DC, or any combination thereof. The structure and design of such filters are within the knowledge of those skilled in the art.

Figure 3:
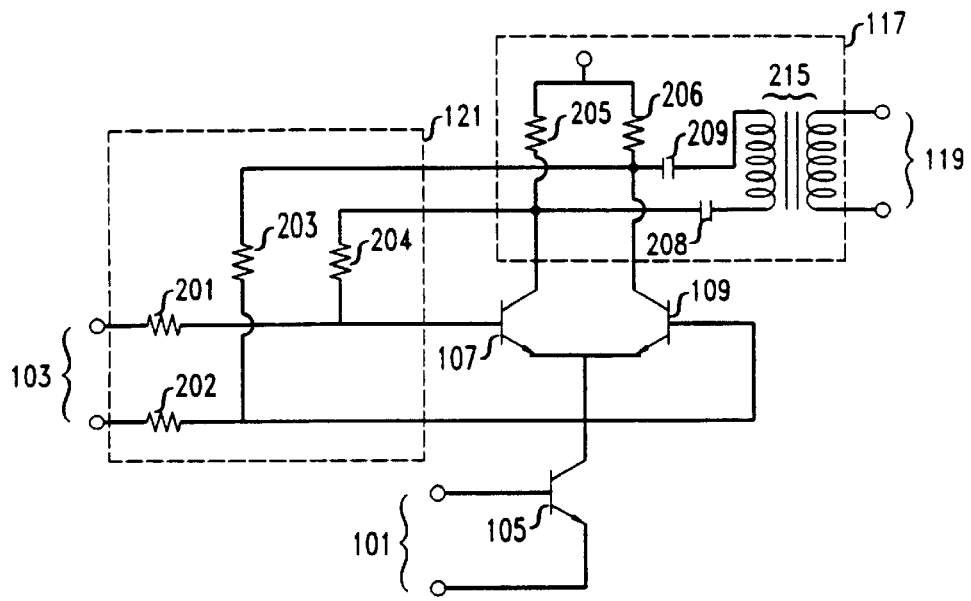
FIG. 3 is a first schematic diagram setting forth an illustrative implementation for the linear modulator of FIG. 1.

FIG. 3 is a schematic diagram setting forth a first illustrative implementation for the linear modulator of FIG. 1. First, second, and third amplifiers 105, 107, 109 are implemented using transistors. For each transistor amplifier, the differential input terminals are the base and the emitter, and the amplifier output is the collector terminal. Diplexer 117 includes resistors 205 and 206, transformer 215, and capacitors 208, 209. Functionally, diplexer 117 is equivalent to diplexer 511 of FIG. 2. Capacitors 208 and 209 provide a relatively low-impedance path for RF signals traveling between amplifiers 107, 109 and transformer 215 while, at the same time, providing a very high-impedance path for baseband signals. Transformer 215 may be designed to resonate with capacitors 208, 209 so as to provide an RF band-pass filter. In practice, transformer 215 provides a very low-impedance path for baseband signals. Additional filtering components could, but need not, be incorporated into the circuit arrangement of diplexer 117. The resistance values of resistors 205 and 206 determine the in-band impedance of the diplexer 117 filter at baseband frequencies, and the impedance of transformer 215 determines the output impedance of the modulator output.

In the illustrative circuit configuration of FIG. 3, feedback circuit 121 is a passive resistive network comprised of resistors 201, 202, 203, and 204. Feedback circuit 121 provides a transfer function, the parameters of which are determined by the ratio of the resistance of resistor 203 to that of resistor 202, the ratio of the resistance of resistor 204 to that of resistor 201, as well as any impedance loading due to the output impedance of the modulating source connected to modulating signal input 103.

The transistors used to implement amplifiers 105, 107, and 109 may require additional biasing and matching components that are not shown in FIG. 3 for the sake of clarity. Transistor biasing and matching are not critical to the invention, and those skilled in the art will be able to provide the necessary details. Any of various well-known techniques may be employed to bias and match these transistors.

Figure 4:
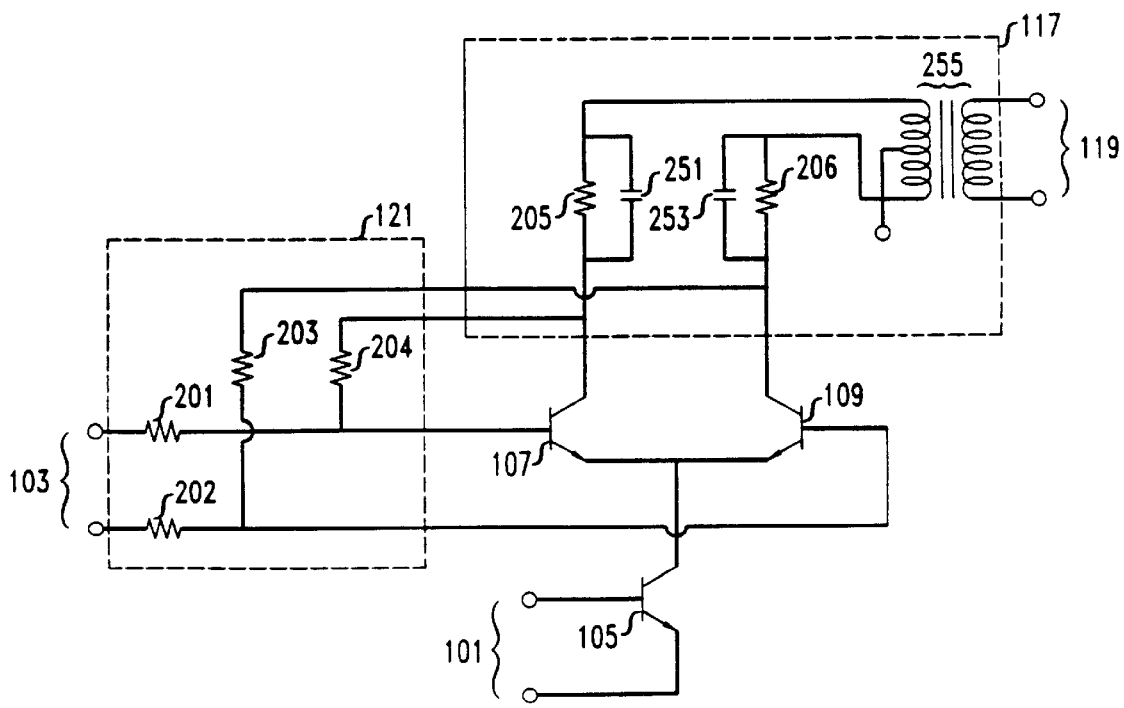
FIG. 4 is a second schematic diagram setting forth an illustrative implementation for the linear modulator of FIG. 1.

FIG. 4 is a schematic diagram setting forth a second illustrative implementation for the linear modulator of FIG. 1. This schematic diagram is substantially similar to that of FIG. 3, with the notable exception that the diplexer 117 of FIG. 4 is constructed in accordance with diplexer 521 of FIG. 2, and not in accordance with diplexer 511. Accordingly, resistor 205 is in parallel with capacitor 251, and resistor 206 is in parallel with capacitor 253. One terminal of resistor 205 and one terminal of resistor 206 are connected directly to respective terminals of transformer 215, and series coupling capacitors 208 and 209 of FIG. 3 are not utilized. The circuit configuration of FIG. 4 could be employed, for example, in situations where it is desired to utilize a differential SAW filter or a differential amplifier at modulator output 119.

Figure 5:
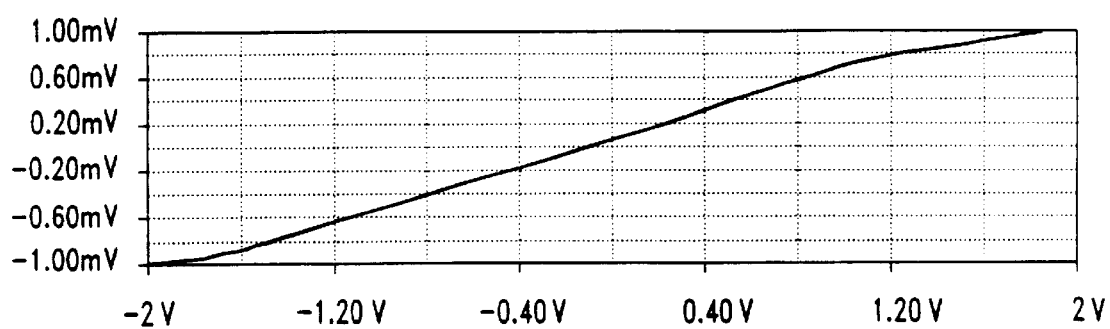
FIG. 5 is a graph showing modulator output amplitude versus the instantaneous amplitude of the modulation signal for a modulator constructed in accordance with FIG. 1.
Figure 5:
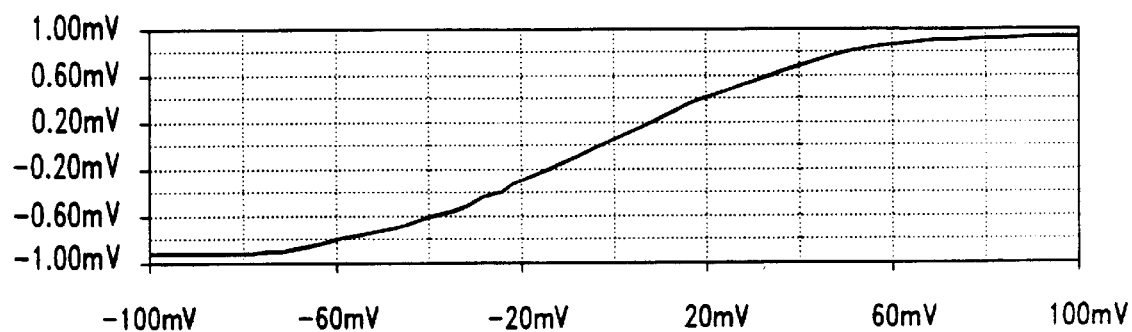

FIG. 5 is a graph showing modulator output amplitude versus modulation input signal for a modulator constructed in accordance with FIG. 1. The upper and lower graphs were prepared using the same circuit configuration and operational parameters, with the exception that, in the upper graph, modulator feedback was employed as described above, but, in the lower graph, this feedback was disabled. Upon examining FIG. 5, it is apparent that the linear portion of the uppermost graph has more than twice the voltage swing of the linear portion of the lower graph. Practical prototyping of the modulator shown in FIG. 4 provided a 6 to 8 dB carrier suppression improvement at room temperatures and even larger improvements at extreme temperatures. The circuit also allowed a much easier manual balance adjustment by fine-tuning resistor R1. Moreover, the circuit displayed a more pronounced tendency to maintain balance over time and temperature relative to prior art designs.

The foregoing description merely serves to illustrate the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended to be only for pedagogical purposes so as to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Moreover, it is intended that such equivalents include both currently known equivalents, as well as equivalents developed in the future that perform the same function, regardless of structure.

I claim:

1. An linear modulator comprising:
    a modulator including a first modulator input and a first modulator output;
    a filter including a first filter input connected to said first modulator output, said filter also including a first filter output and a second filter output; and
    a feedback circuit, said feedback circuit including a first feedback circuit input, a second feedback circuit input, and a first feedback circuit output, said second feedback circuit input being connected to said second filter output and said first feedback circuit output being connected to said first modulator input;
    wherein said first feedback circuit input receives a modulating signal input and said first filter output supplies a modulated signal output, and wherein said feedback circuit serves to increase a linearity between the modulating signal input and the modulated signal output.

2. The linear modulator of claim 1, wherein said filter is a diplexer.

3. The linear modulator of claim 1, wherein said modulator is a single-balanced modulator.

4. The linear modulator of claim 1, wherein said feedback circuit includes a voltage divider.

5. The linear modulator of claim 1, wherein the modulating signal input has an instantaneous value and the modulated signal output has an instantaneous amplitude, the instantaneous value being substantially linearly related to the instantaneous amplitude within a region of linear operation characterized by a linear range of voltages having an upper bound and a lower bound, and the first feedback circuit output is provided so as to increase the difference between the upper bound and the lower bound relative to the difference when no first feedback circuit output is provided, thereby increasing the linearity of the modulator.

6. The linear modulator of claim 1, wherein said modulator also includes a second modulator input, and wherein said second modulator input receives a carrier signal.

7. The linear modulator of claim 6, wherein said modulator includes first and second amplifiers.

8. The linear modulator of claim 7, wherein each amplifier includes first and second inputs, and wherein said first inputs receive the carrier signal and said second inputs are connected to said first feedback circuit output.

9. The linear modulator of claim 6, wherein said feedback circuit includes a voltage divider.

10. The linear modulator of claim 6, wherein said filter filters a set of frequency components and presents the set of frequency components to said second filter output.

11. The linear modulator of claim 10, wherein said filter includes:
    a radio frequency filter to produce the modulated signal output present the first filter output; and
    a baseband filter to produce the set of frequency components present at the second filter output.

12. The linear modulator of claim 11, wherein said filter filters a set of frequency components and presents the set of frequency components to said second filter output.

13. The linear modulator of claim 12, wherein said filter includes:
    a radio frequency filter to produce the modulated signal output present at the first filter output; and
    a baseband filter to produce the set of frequency components present at the second filter output.

14. The linear modulator of claim 12, wherein said filter is a diplexer.

15. The linear modulator of claim 12, wherein said feedback circuit includes a voltage divider.

16. The linear modulator of claim 12, wherein said modulator is a single-balanced modulator.

17. The linear modulator of claim 16, wherein said modulator also includes a second modulator input, and wherein said second modulator input receives a carrier signal.

18. The linear modulator of claim 17, wherein the modulating signal input has an instantaneous value and the modulated signal output has an instantaneous amplitude, the instantaneous value being substantially linearly related to the instantaneous amplitude within a region of linear operation characterized by a linear range of voltages having an upper bound and a lower bound, and the first feedback circuit output is provided so as to increase the difference between the upper bound and the lower bound relative to the difference when no first feedback circuit output is provided, thereby increasing the linearity of the modulator.

* * * * *